(12) United States Patent
Yaqoob et al.

(10) Patent No.: US 8,612,617 B2
(45) Date of Patent: Dec. 17, 2013

(54) RELIABLE MULTICAST TRANSPORT PROTOCOL

(75) Inventors: Asad Yaqoob, Redmond, WA (US); David James Gemmell, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 588 days.

(21) Appl. No.: 11/823,541

(22) Filed: Jun. 28, 2007

(65) Prior Publication Data
US 2009/0006641 A1    Jan. 1, 2009

(51) Int. Cl.
*G06F 15/16* (2006.01)
*H04H 20/71* (2008.01)

(52) U.S. Cl.
USPC ............................ 709/230; 370/312; 370/390

(58) Field of Classification Search
USPC ........................... 709/230–237; 370/310–430
See application file for complete search history.

(56) References Cited

U.S. PATENT DOCUMENTS

| | | |
|---|---|---|
| 5,805,825 A | 9/1998 | Danneels et al. |
| 5,905,871 A | 5/1999 | Buskens et al. |
| 6,049,878 A | 4/2000 | Caronni et al. |
| 6,101,184 A | 8/2000 | Tobe et al. |
| 6,104,709 A | 8/2000 | Rinchiuso et al. |
| 6,144,651 A | 11/2000 | Rinchiuso et al. |
| 6,151,696 A | 11/2000 | Miller et al. |
| 6,154,463 A | 11/2000 | Aggarwal et al. |
| 6,256,673 B1 | 7/2001 | Gayman |
| 6,269,080 B1 | 7/2001 | Kumar |
| 6,269,085 B1 | 7/2001 | Provino et al. |
| 6,385,647 B1 | 5/2002 | Willis et al. |
| 6,427,166 B1 | 7/2002 | Hurst et al. |
| 6,453,438 B1 | 9/2002 | Miller et al. |
| 6,526,022 B1 | 2/2003 | Chiu et al. |
| 6,577,599 B1 | 6/2003 | Gupta et al. |
| 6,594,798 B1 | 7/2003 | Chou et al. |
| 6,693,907 B1 | 2/2004 | Wesley et al. |
| 6,718,361 B1 | 4/2004 | Basani et al. |
| 6,807,578 B2 | 10/2004 | Satran et al. |
| 6,813,714 B1 | 11/2004 | Hardjono et al. |
| 6,904,464 B1 | 6/2005 | Van Langen et al. |
| 6,931,005 B1 | 8/2005 | Wilhelm |
| 6,973,081 B1 | 12/2005 | Patel et al. |
| 7,031,326 B1 | 4/2006 | Shur et al. |
| 7,035,214 B1 | 4/2006 | Seddigh et al. |
| 7,035,217 B1 | 4/2006 | Vicisano et al. |

(Continued)

OTHER PUBLICATIONS ("RFC1301—Multicast Transport Protocol", S. Armstrong, A. Freier, K. Marzullo; Feb. 1992; www.faqs.org/rfcs/rfc1301.html).*

(Continued)

*Primary Examiner* — Afshawn Towfighi
(74) *Attorney, Agent, or Firm* — Merchant & Gould P.C.

(57) ABSTRACT

A semi-reliable multicast transport protocol uses multiple channels for communication between a server and multiple client devices. A join channel allows the sever to negotiate with client devices to join and exit a transmission session. A communication channel allows the server to communicate with client devices about a status of the transmission session. A polling channel initiated by a content transfer protocol, which runs on top of the transport protocol, transmits polling queries received from the content transfer protocol, receives client device responses to the polling queries, and passes the client device responses to the content transfer protocol. A data channel transmits data to client devices over a network.

19 Claims, 5 Drawing Sheets

(56) References Cited

U.S. PATENT DOCUMENTS

| | | | |
|---|---|---|---|
| 7,035,657 B2 | 4/2006 | Chen et al. | |
| 7,107,606 B2 | 9/2006 | Lee | |
| 7,133,371 B2 | 11/2006 | Helm et al. | |
| 7,143,179 B2 | 11/2006 | Yaport et al. | |
| 7,177,917 B2 | 2/2007 | Giotta | |
| 7,184,421 B1 | 2/2007 | Liu et al. | |
| 7,191,332 B1 | 3/2007 | Pankajakshan et al. | |
| 7,206,811 B2 | 4/2007 | Skurikhin et al. | |
| 7,227,843 B2 | 6/2007 | Belanger et al. | |
| 7,355,975 B2 | 4/2008 | Liu et al. | |
| 7,400,601 B2 | 7/2008 | Moritani et al. | |
| 7,882,240 B2 | 2/2011 | Dickens et al. | |
| 8,018,933 B2 | 9/2011 | Dickens et al. | |
| 2002/0024956 A1 | 2/2002 | Keller-Tuberg | |
| 2002/0035730 A1 | 3/2002 | Ollikainen et al. | |
| 2002/0129159 A1 | 9/2002 | Luby et al. | |
| 2002/0165920 A1 | 11/2002 | Keller-Tuberg | |
| 2003/0126514 A1* | 7/2003 | Shabbir Alam et al. | 714/43 |
| 2003/0147390 A1 | 8/2003 | Rizzo et al. | |
| 2003/0206549 A1 | 11/2003 | Mody et al. | |
| 2004/0132448 A1 | 7/2004 | Torres et al. | |
| 2004/0213177 A1 | 10/2004 | Moritani et al. | |
| 2004/0267960 A1 | 12/2004 | Riedle | |
| 2005/0089035 A1 | 4/2005 | Klemets et al. | |
| 2005/0160345 A1 | 7/2005 | Walsh et al. | |
| 2005/0216472 A1 | 9/2005 | Leon et al. | |
| 2006/0030312 A1 | 2/2006 | Han et al. | |
| 2006/0050672 A1 | 3/2006 | Shim et al. | |
| 2006/0159090 A1 | 7/2006 | Chang et al. | |
| 2006/0233271 A1 | 10/2006 | Savas et al. | |
| 2006/0239275 A1 | 10/2006 | Zlateff et al. | |
| 2006/0248090 A1 | 11/2006 | Bennett et al. | |
| 2007/0002858 A1 | 1/2007 | Bichot et al. | |
| 2007/0005804 A1 | 1/2007 | Rideout | |
| 2007/0058626 A1 | 3/2007 | Keller et al. | |
| 2007/0083667 A1 | 4/2007 | Cooper | |
| 2007/0091889 A1* | 4/2007 | Xiao et al. | 370/390 |
| 2007/0118866 A1 | 5/2007 | Chen | |
| 2007/0147411 A1 | 6/2007 | Bijwaard et al. | |
| 2007/0265968 A1 | 11/2007 | Kahn et al. | |
| 2008/0181159 A1* | 7/2008 | Metzler et al. | 370/312 |
| 2008/0183808 A1 | 7/2008 | Salesky et al. | |
| 2009/0003342 A1 | 1/2009 | Dickens et al. | |
| 2011/0286379 A1 | 11/2011 | Dickens et al. | |

OTHER PUBLICATIONS ("An End-to-End Reliable Multicast Protocol Using Polling for Scaleability"; Barcellos, Marinho, Ezhilchelvan, Paul; 1998 IEEE).*
("Scalable Multicast Representative Member Selection"; Donahoo, Michael, Ainapure, Sunila; 2001 IEEE).*
Kenneth Miller."Reliable Multicast Protocol and Applications" Date: Sep. 1998,pp. 19-37,vol. 1, No. 2,The Internet Protocol Journal, San Jose, CA.
McKinley, et al., "H-RMC: A Hybrid Reliable Multicast Protocol for the Linux Kernel", Date: 1999, Article No. 8, ACM Press, New York, USA.
Shiroshita, et al., "Reliable Multicast Transport Protocol (RMTP)", Date: Feb. 7, 1997, pp. 1-7, Information and Communication Systems Laboratory, NTT.
Floyd, et al., "A Reliable Multicast Framework for Light-Weight Sessions and Application Level Framing", Retrieved at << http://conferences.sigcomm.org/sigcomm/1995/papers/floyd.pdf >>, Nov. 1996, pp. 1-24.
Holbrook, et al., "Log-based Receiver-Reliable Multicast for Distributed Interactive Simulation", Retrieved at << http://cs.ecs.baylor.edu/~donahoo/classes/5321/papers/HSC95.pdf >>, ACM SIGCOMM, Aug. 28-Sep. 1, 1995, pp. 328-341.
Markopoulou, et al., "Hierarchical Reliable Multicast: performance analysis and placement of proxies", Retrieved at << http://mmnetworks.stanford.edu/papers/markopoulou_ngc00.pdf >>, NGC, Networked Group Communication, Nov. 8-10, 2000, pp. 1-9.

Paul, et al., "Reliable Multicast Transport Protocol (RMTP)", Retrieved at << http://www.it.iitb.ac.in/~supriya/Seminar/paul97reliable.pdf >>, IEEE Journal on Selected Areas in Communications, vol. 15, No. 3, Apr. 1997, pp. 1-19.
Radoslavov, et al., "A Comparison of Application-Level and Router-Assisted Hierarchical Schemes for Reliable Multicast", Retrieved at << http://128.9.176.20/divisions/div7/publication_files/comparison_of_application.pdf >>, IEEE/ACM Transactions on Networking, vol. 12, No. 3, Jun. 2004, pp. 10.
Yavatkar, et al., "A Reliable Dissemination Protocol for Interactive Collaborative Applications", Retrieved at << http://reference.kfupm.edu.sa/content/r/e/a_reliable_dissemination_protocol_for_in_224489.pdf >>, In Proceedings of the ACM Multimedia Conference, Nov. 1995, pp. 12.
Gemmell, Jim., "Scalable Reliable Multicast Using Erasure-Correcting Re-sends", Retrieved at << http://reference.kfupm.edu.sa/content/s/c/scalable_reliable_multicast_using_erasur_359684.pdf >>, Technical Report, MSR-TR-97-20, Jun. 30, 1997, pp. 1-15.
Kermode, Roger George., "Smart Network Caches: Localized Content and Application Negotiated Recovery Mechanisms for Multicast Media Distribution", Retrieved at << http://pubs.media.mit.edu/pubs/papers/kermode-phd.pdf >>, Jun. 1998, pp. 1-172.
Metzner, John J., "An Improved Broadcast Retransmission Protocol", Retrieved at << http://ieeexplore.ieee.org/stamp/stamp.jsp?tp=&arnumber=1096119 >>, IEEE Transactions on Communications, vol. 32, No. 6, Jun. 1984, pp. 679-683.
Nonnenmacher, et al., "Reliable multicast: Where to use FEC", Retrieved at << http://www.eurecom.fr/~btroup/BPublished/FECgain.ps.gz >>, 1996, pp. 1-15.
Nonnenmacher, et al., "Parity-Based Loss Recovery for Reliable Multicast Transmission", Retrieved at << http://www4.ncsu.edu/~rhee/export/papers/nonnenmacher97paritybased.pdf >>, Technical Report 97-17, Mar. 1997, pp. 1-21.
Rizzo, Luigi., "Effective Erasure Codes for Reliable Computer Communication Protocols", Retrieved at << http://www.cs.utexas.edu/users/lam/395t/2010%20papers/FEC-rizzo.pdf >>, ACM SIGCOMM Computer Communication Review, vol. 27, No. 2, Apr. 1997, pp. 24-36.
Gemmell, et al., "The PGM Reliable Multicast Protocol", Retrieved at << http://wmedia.grnet.gr/RMbackground/PGM_IEEE_Network.pdf >>, IEEE Network, vol. 17, No. 1, Jan./Feb. 2003, pp. 1-13.
Gemmell, et al., "Fcast Multicast File Distribution", Retrieved at << http://reference.kfupm.edu.sa/content/f/c/fcast_multicastfile_distribution_116541.pdf >>, IEEE Network, vol. 14, No. 1, Jan./Feb. 2000, pp. 1-24.
Rizzo, Luigi., "pgmcc: a {TCP}-Friendly Single-Rate Multicast congestion control scheme", Retrieved at << http://conferences.sigcomm.org/sigcomm/2000/conf/paper/sigcomm2000-1-2.pdf >>, ACM SIGCOMM, Aug. 28-Sep. 1, 2000, pp. 17-28.
Liang, et al., "TCP-SMO: Extending TCP to Support Medium-Scale Multicast Applications", Retrieved at << http://www-dsg.stanford.edu/sliang/tcpm_infocom.pdf >>, In IEEE Infocom, Jun. 2002, pp. 10.
Jeacle, et al., "TCP-XM: Unicast-enabled Reliable Multicast", Retrieved at << http://www-test.cl.cam.ac.uk/research/srg/netos/papers/2005-jeacle2005tcpxm.pdf >>, Proceedings 14th International Conference on Computer Communications and Networks, Oct. 17-19, 2005, pp. 6.
Mysore, et al., "FTP-M: An FTP-like Multicast File Transfer Application", Retrieved at << http://www.google.co.in/url?sa=t&source=web&cd=2&ved=0CB8QFjAB&url=http%3A%2F%2Fcseweb.ucsd.edu%2Fusers%2Fvarghese%2FPAPERS%2Fmanaftp.ps&ei=680qTe7fl826hAfH1ODaDg&usg=AFQjCNGTZIRNO9Qx4PqwpA2a0DPLCxpebQ >>, Technical Report, CS2001-0684, Sep. 11, 2001, pp. 5.
Ghosh, et al., "Congestion Control in Multicast Transport Protocols", Technical Report, WUCS-98-19, Jun. 1998, pp. 22.
Mathis, et al., "The Macroscopic Behavior of the {TCP} Congestion Avoidance Algorithm", Retrieved at << http://www.cs.tut.fi/~dunaytse/ns2/mathis-tcpmodel-ccr97.pdf >>, ACM SIGCOMM Computer Communication Review, vol. 27, No. 3, Jul. 1997, pp. 1-16.

(56) References Cited

OTHER PUBLICATIONS

Montgomery, Todd., "A Loss Tolerant Rate Controller for Reliable Multicast", Retrieved at << http://www.cs.wvu.edu/~tmont/ltrc-doc.ps.gz >>, Technical Report, NASA• IVV-97-011, Aug. 22, 1997, pp. 1-12.
Padhye, et al., "Modeling TCP Throughput: A Simple Model and its Empirical Validation", Retrieved at << http://web.univ-pau.fr/~cpham/TCP/Padhye98.pdf >>, May 30, 1998, pp. 1-23.
Visoottiviseth, et al., "M/TCP: The Multicast-extension to Transmission Control Protocol", Proceedings of ICACT, Feb. 2001, pp. 6.
Barcellos, et al., "Efficient TCP-like Multicast Support for Group Communication Systems", Proceedings of the IX Brazilian Symposium on Fault-Tolerant Computing, Mar. 2001, pp. 15.
Widmer, et al., "TCP-Friendly Multicast Congestion Control (TFMCC): Protocol Specification", Retrieved at << http://tools.ietf.org/html/rfc4654 >>, Aug. 2006, pp. 33.
Golestani, et al., "Fundamental Observations on Multicast Congestion Control in the Internet", Retrieved at << http://www.cs.ust.hk/faculty/bli/660h/golestani99fundamental.pdf >>, Proceedings IEEE Eighteenth Annual Joint Conference of the IEEE Computer and Communications Societies, Mar. 21-25, 1999, pp. 1-23.
Hibler, et al., "Fast, Scalable Disk Imaging with Frisbee", Retrieved at << http://www.usenix.org/events/usenix03/tech/full_papers/full_papers/hibler/hibler.pdf >>, In Proceedings of the 2003 USENIX Annual Technical Conference, Jun. 2003, pp. 14.
Floyd, et al.. "A Reliable Multicast Framework for Light-Weight Sessions and Application Level Framing". IEEWAU4 Transactions Networking, Date: Dec. 1997. pp. 784-803, vol. 5, No. 6.
Gemmell, et al., "In Search of an API for Scalable Reliable Multicast", Technical Report, MSR-TR-97-17, Date: Jun. 23, 1997, pp. 1-14.
Tung. Teck-Lee, "MediaBoard: A Shared Whiteboard Application for the MBone". Computer Science Division (EECS), University of California, Berkeley, CA 94720-1776, pp. 1-38.
Zhang, et al., "Sender-Adaptive and Receiver-Driven Layered Multicast for Scalable Video Over the Internet", IEEE Transactions on Circuits and Systems for Video Technology, Date: Apr. 2005, pp. 482-495, vol. 15, No. 4.
U.S. Appl. No. 11/824,280, Amendment and Response filed Jun. 11, 2013, 17 pgs.
U.S. Appl. No. 11/824,280, Office Action mailed Mar. 11, 2013, 12 pgs.
U.S. Appl. No. 13/198,621, Office Action mailed May 16, 2013, 10 pgs.
Chiu, et al., "TRAM: A Tree-based Reliable Multicast Protocol", Sun Microsystems Laboratories, of Sun Microsystems, Inc., USA, Jul. 1998, 24 pgs.
Chiu, et al., "Pruning Algorithms for Multicast Flow Control", Sun Microsystems Laboratories, Burlington, MA, Jun. 2000, 10 pgs.
Khanna, et al., "Failure Handling in a Reliable Multicast Protocol for Improving Buffer Utilization and Accommodating Heterogeneous Receivers", PRDC, 10th Pacific Rim International Symposium on Dependable Computing (PRDC'04), 2004, 20 pgs.
Kondratiev, Dmitri, "ARM—Active Reliable Multicast", no date, pp. 3-12.
Royer, Elizabeth et al., "Multicast Operation of the Ad-hoc On-Demand Distance Vector Routing Protocol", Dept. of Electrical and Computer Engineering. University of California. Santa Barbara, Nov. 1999, 12 pgs.
Shim, Hyong Sop et al., "Stateful Multicast Services for Supporting Collaborative Applications", CSE-TR-351-97, Department of EECS, University of Michigan, Nov. 1997, 13 pgs.
Subramaniam, Sandeep et al., "Building a Reliable Multicast Service Based on Composite Protocols", Technical Report, ITTC-F2004-TR-19740-11, Date: Jul. 2003, pp. 1-116, The University of Kansas Center for Research, Inc., 2335 Irving Hill Road, Lawrence, KS 66045-7612, 124 pgs.
Swan, Andrew et al., "Aspen: A Multicast Session Layer", Computer Science Division, University of California, Berkeley, 2004, pp. 1-6.
U.S. Appl. No. 11/823,143, Amendment and Response filed Oct. 21, 2010, 23 pgs.
U.S. Appl. No. 11/823,143, Amendment and Response filed Oct. 7, 2010, 12 pgs.
U.S. Appl. No. 11/823,143, Amendment and Response filed Feb. 11, 2010, 8 pgs.
U.S. Appl. No. 11/823,143, Amendment and Response filed Apr. 19, 2010, 8 pgs.
U.S. Appl. No. 11/823,143, Amendment and Response filed Apr. 6, 2011, 13 pgs.
U.S. Appl. No. 11/823,143, Notice of Allowance mailed Jun. 13, 2011, 7 pgs.
U.S. Appl. No. 11/823,143, Office Action mailed Jan. 7, 2011, 6 pgs.
U.S. Appl. No. 11/823,143, Office Action mailed Jul. 22, 2010, 7 pgs.
U.S. Appl. No. 11/823,143, Office Action mailed Aug. 11, 2009, 8 pgs.
U.S. Appl. No. 11/824,280, Amendment and Response filed Nov. 22, 2010, 10 pgs.
U.S. Appl. No. 11/824,280, Amendment and Response filed Apr. 26, 2010, 10 pgs.
U.S. Appl. No. 11/824,280, Office Action mailed Jan. 26, 2010, 10 pgs.
U.S. Appl. No. 11/824,280, Office Action mailed Jul. 23, 2010, 12 pgs.
U.S. Appl. No. 11/824,890, Amendment and Response filed Feb. 5, 2010, 13 pgs.
U.S. Appl. No. 11/824,890, Amendment and Response filed Aug. 20, 2010, 11 pgs.
U.S. Appl. No. 11/824,890, Notice of Allowance mailed Sep. 20, 2010, 8 pgs.
U.S. Appl. No. 11/824,890, Office Action mailed Jun. 1, 2010, 11 pgs.
U.S. Appl. No. 11/824,890, Office Action mailed Aug. 10, 2009, 12 pgs.
U.S. Appl. No. 13/198,621, Amendment and Response filed Aug. 16, 2013, 17 pgs.
U.S. Appl. No. 11/824,280, Office Action mailed Sep. 3, 2013, 4 pgs.
U.S. Appl. No. 11/824,280, Amendment and Response filed Oct. 31, 2013, 9 pgs.
U.S. Appl. No. 13/198,621, Office Action mailed Nov. 7, 2013, 16 pgs.

* cited by examiner

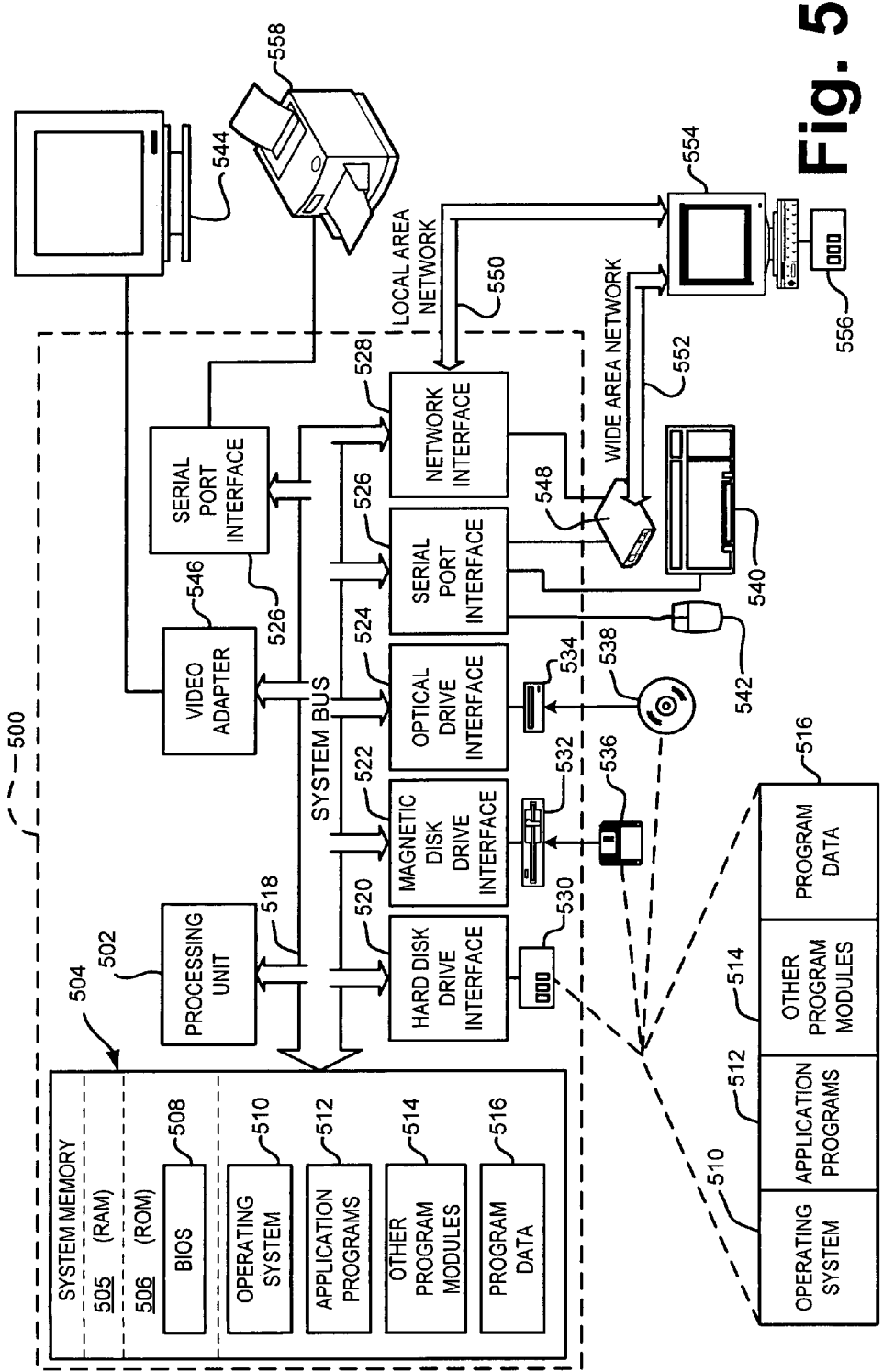

RELIABLE MULTICAST TRANSPORT PROTOCOL

BACKGROUND

Multicast implementations in enterprise servers generally fall into two categories: unreliable and reliable. Unreliable implementations, as might be expected given the name, are used in applications where it is okay if content is missed by the receiver. An example of this is a broadcast of a company meeting. If a client device misses a packet, the video/audio may skip a little, but the server should not have to resend the packet—the client's receipt of the one missed packet is not critical. Reliable implementations, by contrast, are used in applications where it is mandatory that the client device receive the entire transmission. An example of this is distribution of a security hot fix or patch. If a client misses a portion of the transmission, the client may have received an incomplete hot fix and thus still be vulnerable to the security flaw.

In present multicast implementations, in order to provide reliability the end-to-end principle indicates that each client device (receiver) should send messages back to the multicast server (sender) to acknowledge receipt. This then raises a problem with scalability, as too many messages coming back may implode upon the sender overflowing its incoming network capacity and/or its capacity to process such messages. There is also a scalability issue when the sender must store state information for each receiver, causing its memory requirements to grow with the number of receivers. Reliable multicast protocols typically address scale by using a mix of message suppression, hierarchy, and forward error correction (FEC). Further challenges for reliable multicast are flow control and congestion control, including reasonably fair bandwidth sharing with the standard transport control protocol (TCP) (referred to as being "TCP-friendly").

SUMMARY

A semi-reliable multicast transport protocol is described that uses multiple channels for communication between a server and multiple client devices. A join channel allows the server to negotiate with client devices to join and exit a transmission session. A communication channel allows the server to communicate with client devices about a status of the transmission session. A polling channel initiated by a content transfer protocol, which runs on top of the transport protocol, transmits polling queries received from the content transfer protocol, receives client device responses to the polling queries, and passes the client device responses to the content transfer protocol. A data channel transmits data to client devices over a network.

A reliable multicast transmission system is also disclosed that is implemented in a transport protocol layer and a content transfer protocol layer that runs on top of the transport protocol layer. The transport protocol layer may have the following structure. A join channel allows the server to negotiate with client devices to join and exit a transmission session. A communication channel allows the server to communicate with client devices about a status of the transmission session. A polling channel initiated by a content transfer protocol, which runs on top of the transport protocol, transmits polling queries received from the content transfer protocol, receives client device responses to the polling queries, and passes the client device responses to the content transfer protocol. A data channel transmits data to client devices over a network. The content transfer protocol layer may be understood in terms of a data management function and a polling management function. The data management function identifies the data file for the multicast transmission session and provides the data file to the transport protocol layer in a form suitable for transmission. The polling management function generates the polling queries to monitor reliability of data transmissions by the transport protocol layer. The polling management function passes the polling queries to the transport protocol layer for transmission to the client devices, and receives responses to the polling queries by the client devices from the transport protocol layer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

BRIEF DESCRIPTION OF THE DRAWINGS

FIG. 5 is a schematic diagram of a general purpose computing device that may be implemented as a reliable multicast server or a client device.

DETAILED DESCRIPTION

"Multicast" is a term used to describe the delivery of data to a group of destinations, usually from a server computer to multiple client computer devices, simultaneously. The goal of multicast is to use the most efficient strategy to deliver the messages over each link of the network only once, creating copies only when the links to the destinations split. The following scenarios are examples of when multicast content transfer may be desirable.

- A web-based e-mail service wishes to re-purpose 200 machines by putting a new image on their disks and rebooting.
- A computer manufacturer wishes to push a disk image onto a batch of new personal computers (PCs) that have been assembled.
- A service provider wishes to push a copy of a database out to 300 machines.
- A large corporation wishes to send a software patch to all of its PCs on its campus.

The content transferred may be anything, but will usually be a file. The terms "content," "file," and "image" are used interchangeably in this document.

Previous work on multicast has either focused on extreme scalability at the expense of key features like throughput, flow, and congestion control, or else has achieved only very limited scalability and performance. The reliable multicast protocol described herein results in very high performance, transferring at up to gigabit/second speeds, with mid-range scalability (e.g., to around 1000 receivers). A multicast session is considered "reliable" if the protocol ensures that all client devices in a transmission session receive all of the data. As it may be fairly common for the read/write speed of a disk drive storing the file or central processing unit (CPU) to be a bottleneck rather than the network—the network is generally the bottleneck in many prior multicast protocols to date—both flow control and congestion control may be implemented.

One implementation of this reliable form of multicast, referred to herein as "on-demand multicast," allows client devices to join or leave a transmission at any time. In the on-demand multicast implementation, there is no transmission session start or end time—once an administrator creates a session, the data is available for transfer regardless of when a request for the data is received from a client device. In this sense, the transmission session is constantly "on," even if no data transmitted over the connection at a particular time, e.g., when all prior requests have been completely serviced. And again, client devices can join a transmission session at anytime and the protocol will ensure that all packets of data are received by each client that joins.

Figure 1:
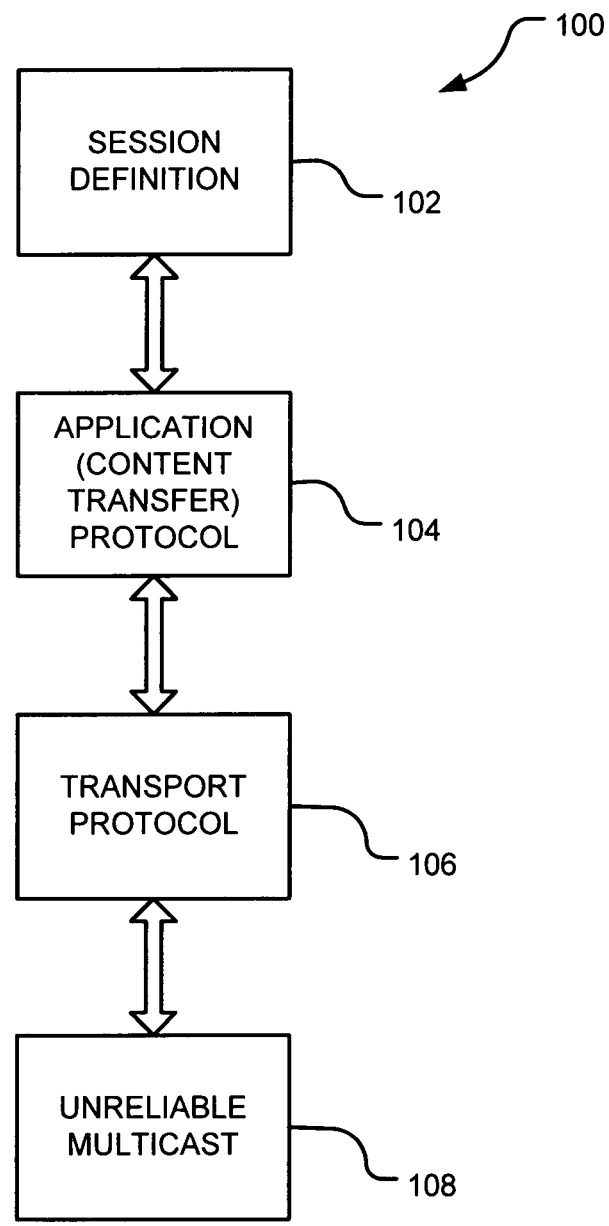
FIG. 1 is a schematic diagram of an implementation of additional transport and content transfer protocols to a multicast platform to create a reliable multicast transmission.

The multicast implementation disclosed herein is based upon the cooperation of three multicast protocols for distributing content, generally files and other data objects (hereinafter referred to as "files" or "content"), as depicted in FIG. 1 that together result in a reliable session. A session management protocol 102 may be used to define multicast sessions, schedule sessions, assign an address/port for the session, identify the file(s) to transmit in a session, and schedule termination of the session. An application-layer content transfer protocol 104 for handling content (e.g., similar to file transfer protocol (FTP)) may be implemented to transfer files. A transport-layer protocol 106 (similar to transmission control protocol (TCP)) may be implemented for use in multicast situations. All data packets are sent and received using the transport protocol 106. The transport protocol 106 may run on top of a standard internet protocol (IP) or unreliable multicast 108 to create a reliable multicast implementation from an unreliable base multicast protocol 108. Any other unreliable multicast protocol may be used in place of the base IP multicast. The application-layer content transfer protocol 104 may similarly run on top of the transport protocol 106.

The content transfer protocol 104 sends data content over the transport protocol 106. When the content transfer protocol 104 is initialized for a given file, it may divide the content into blocks of data that may be transmitted in packets by the transport protocol 106. The content transfer protocol 104 may also use a polling feature in the transport protocol to poll the client devices for requested ranges of blocks from the file. The content transfer protocol 104 may then send the requested blocks over the transport protocol 106. The transport protocol 106 may handle the registration of client devices, e.g., through a join handshake procedure, and assign identification numbers to the client devices. The transport protocol 106 may then provide notification to the content transfer protocol 104 of client devices joining and leaving the session and also provide status updates. However, the content transfer protocol 104 may be responsible for authorizing client devices to join a session.

The content transfer protocol 104 may service older client devices before newer ones to help prevent new requests stalling old clients from completing. To facilitate this hierarchy, the content transfer protocol 104 may track the length of time each client device remains in the session. As described in greater detail below, the content transfer protocol 104 may also merge the requests for blocks of the data file received from client devices in response to a pool request to remove duplicate block requests. When merging block requests, the content transfer protocol 104 may begin with the blocks requested by the oldest client, and then merge only blocks from other clients that joined the session within time T of the oldest client (e.g., T=1 minute). All other requests are ignored. The list may be sorted by block number. The content transfer protocol 104 may then send each block in the list in order. Once content transfer protocol 104 reaches the end of the list, it may again polls and constructs a new list of requested blocks. This process may continue until the end of the session as described in greater detail below with respect to FIG. 2.

When a client device joins the transmission session, it sends a join request via the transport protocol 106 to the multicast server, which responds with a join acknowledgement (JOIN-ACK) packet. The client device then sends a query channel reply (QCR) packet (further described herein below) which completes the join handshake. The client device is then ready to participate in the session.

When client devices join a transmission session, the transport protocol 106 may deliver several different types of messages during the course of the session including data packets, query channel client (QCC) packets (further discussed herein below), QCR packets, and poll packets. Data packets may have a header that identifies what block of the content (file) is being transmitted as indicated below.

---

UDP Header
Transport Header:
Packet sequence number
Content Header:
Block number
Content Payload:
Block contents

---

The content transfer protocol 104 on the client device can then store the received data as it desires, e.g., by storing the indicated blocks of the file in block order as opposed to the order transmitted. For QCC and QCR packets, the transport protocol 106 allows data for use by the content transfer protocol 104 to identify client devices in the session, collect round trip time (RTT) information, and select an acknowledgement device as further described below. Upon receipt of poll packets, the content transfer protocol 104 on the client device may respond, for example, through an acknowledgement indicating a list of block ranges that are needed to complete transmission of the file.

The transport protocol 106 may select one client of the many client devices that may exist in the session as an "ACKer," a representative client device to provide feedback to the multicast server on behalf of all connected client devices. Packets received from the multicast server may contain a header field indicating the identity of the current ACKer, so that client devices know when they have been selected. The ACKer acknowledges receipt of each packet by returning an acknowledgement (ACK) packet. The ACKer may always immediately communicate with multicast server. However, to avoid an implosion of messages at the server, all other clients randomly delay their transmissions to spread them out. The ACKer may also report its available buffer space, which the multicast server uses for flow control. In this manner the transport control 106 ensures that there are never more packets in transmission than can fit into the buffer space of the ACKer.

For some messages, the client devices may "suppress" their transmission, i.e., never send it, if they learn a message is presently redundant. For example, loss is communicated to the server by sending negative acknowledgement (NAK) packets. The server sends out a NAK confirmation (NCF) via the transport protocol 106 to confirm receipt of a NAK. The transport protocol 106 will later send a repair data (RDATA) packet, a re-send of the original data (ODATA) packet that was lost. If a client device receives an NCF or RDATA for an ODATA packet that it was not received before sending out a NAK, the transport control protocol 106 does not send the NAK, since some other client must have already successfully sent one.

The transport protocol 106 may transmit a QCC packet from the multicast server to elicit a response from all client devices. The QCC packet may include a back-off interval calculated to prevent implosion. QCR messages allow the multicast server to keep a current list of clients in the session, which can be reported to the content transfer protocol 104. QCCs may also be sent when the ACKer is lost from the session and a new ACKer needs to be selected. QCCs are also sent periodically to "keep-alive" the status of clients, and also to obtain application level data (typically used for status reports) in the QCRs. The server may allow the content transfer protocol 104 to request an interval for issuing QCCs, so that it will know how current its reported state of clients is.

Figure 2:
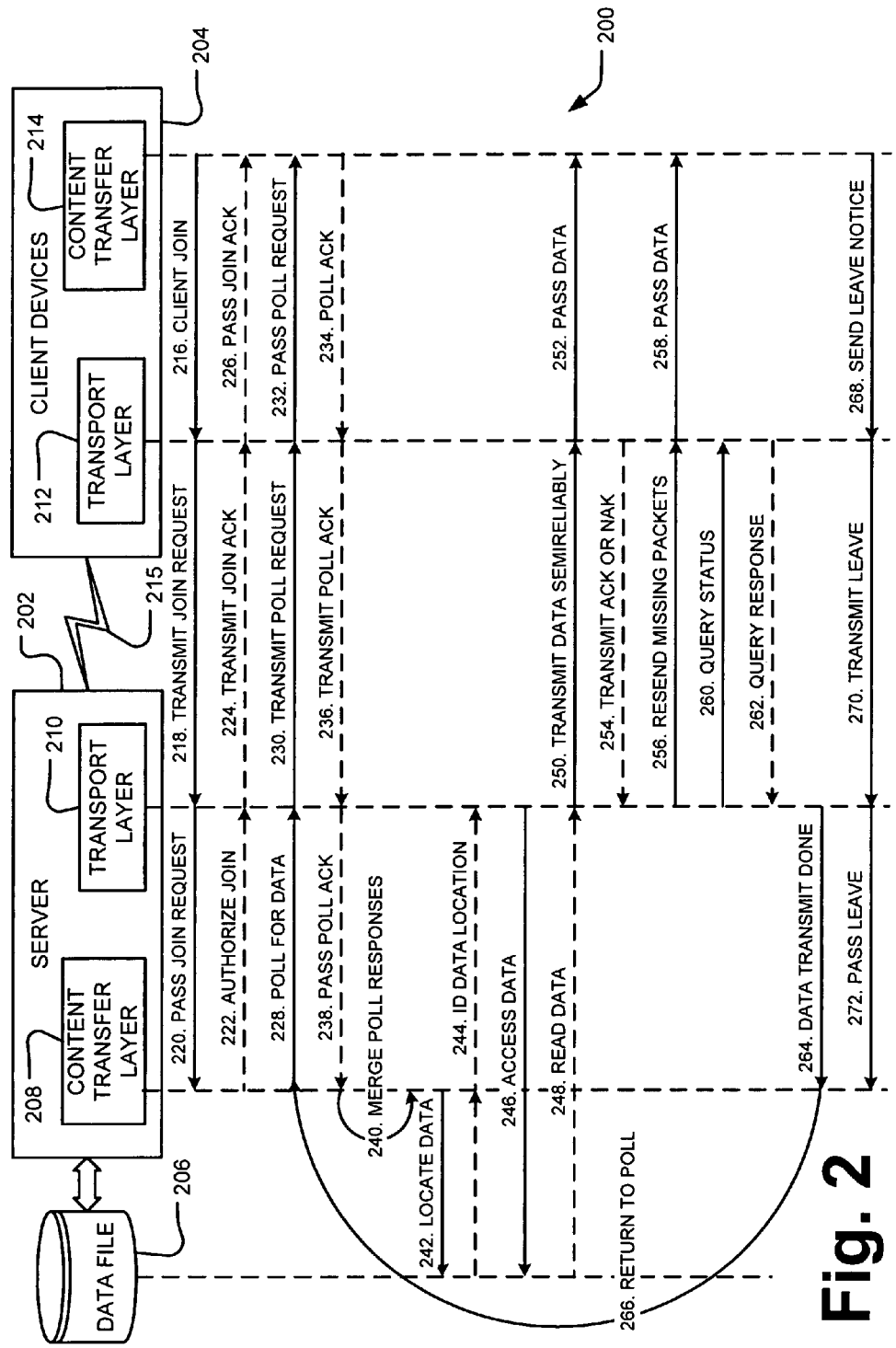
FIG. 2 is a schematic sequence diagram depicting an implementation of a protocol sequence between a server and client devices using a content transfer protocol and a transport protocol.

An exemplary implementation of a reliable multicast distribution system 200 is depicted in FIG. 2. The multicast distribution system 200 includes a multicast server 202 and one or more client devices 204. For the sake of simplicity of FIG. 2, only one client device is depicted, but in reality multiple client devices, perhaps hundreds or thousands may be connected with the multicast server 202 via a network 215. A data source 206 may also reside on or be accessible to the multicast server 202. A content transfer protocol 208 and a transport protocol 210 operate on the multicast server 202. Similarly on the client-side, a transport protocol 212 and a content transfer protocol 214 operate on each of the client devices 204.

The multicast server 202 provides multicast data distribution over the network 215 according to the transmission protocol 210 running on the multicast server 202 and the corresponding transmission protocol 212 operating on the client devices 204. The transmission protocol 210, 212 handles the networking layer of multicast transmissions. Such functions may include registering for transmission control protocol (TCP) and user datagram protocol (UDP) endpoints with the multicast network, accepting incoming TCP/UDP packets and forwarding them to the correct content provider, and generating and sending TCP/UDP response packets. TCP endpoints are used by the content transfer protocol 208, 214 to make and acknowledge session join requests made by client devices 204. UDP endpoints are used to transmit data over the network 215 on a multicast channel.

The content transfer protocol 208, 214 may be another software module running on the multicast server 202 or client device 204, and may communicate with the transmission protocol 210, 212 via an application protocol interface (API) designed specifically to support the content transfer protocol 208, 214. The content transfer protocol 208, 214 may be designed to manage data files, e.g., find, read, write, and transform particular types of data into a form acceptable for transmission by the transmission protocol 210, 212. The transmission protocol 210, 212 is agnostic to the type, size, format, or location of the data file; the purpose of the content transfer protocol 208, 214 is to manage these issues so that the transmission protocol 210, 212 does not have to.

In addition to providing content, the content transfer protocol 208, 214 may also authorize each client device 204 requesting to join a session. This provides greater flexibility and control to the content transfer protocol 208, 214 with respect to who gets to join the session. The requests to join the session, e.g., in the form of a client access token, may be provided by the content transfer protocol 214 at the client device 204 and received by the multicast server 202 over TCP, which provides easy method for receiving client identity at the multicast server 202. The transmission protocol 210 at the multicast server 202 may be configured to apply a specific discretionary access control list to control access to the multicast session and it may also forward the client token to the content transfer protocol 208 on the multicast server 202. It is then the responsibility of the content transfer protocol 208 on the multicast server 202 to apply restrictions to content or denial of service based on the authentication data.

The content transfer protocol 214 on the client device 204 handles the data content received by the client device 204 as part of a multicast transmission. The transport protocol 212 on the client device 204 may simply pass the data received via multicast to the content transfer protocol 214 that then writes the data to storage in an appropriate content store (not shown) either on or connected with the client device 204. The content transfer protocols 208, 214 may be authored by the same entity to providing a package of content distribution plug-ins at each end of the multicast distribution system that are able to manage the storage and retrieval of the distributed content.

The transmission protocol 210 of the multicast server 202 provides an extensible mechanism which may allow any third-party developer to deliver content using the transmission protocol 210. The third-party developer can design a content transfer protocol 208 for the multicast server 202 to provide the contents by, for example, reading from a file, a database, a memory buffer, socket, or by any other means, as long as it provides the data in a form that meets the requirements set by transmission protocol 210. Each content transfer protocol 208 may be registered with the multicast server 202 and may be used by the transmission protocol 210 when a transmission session is requested for that content transfer protocol 208.

While content transfer protocol 208, 214 is not concerned with how the data is delivered, the transmission protocol 210, 212 may impose one or more high-level requirements for contents provided by the content transfer protocol 208 on the multicast server 202. One exemplary requirement may be that the content transfer protocol 208 must be able to determine the size of the data file 206 at the start of a transmission session. Another exemplary requirement may be that the content transfer protocol 208 must guarantee that the data file 206 will remain same during the lifetime of the transmission session. A further exemplary requirement may be that the content transfer protocol 208 must provide random or non-sequential access to blocks of data representing subdivisions of the data file 206. Yet another exemplary requirement may be that the content transfer protocol 208 should be capable of supporting the provision of content for multiple open channels at the same time.

Each multicast session may be scheduled by an administrator, or created as an on-demand session. In one implementation, if a scheduled session is pending, then no new session will be created on-demand; the client device 204 will be instructed to wait to join for the scheduled session. Scheduled sessions may also have a threshold number of client devices 204. If the number of client devices 204 exceeds the threshold, the session may begin without waiting for the scheduled time. For on-demand sessions, any request for the file results in a multicast session being instantiated and client devices 204 may join the session at any time to receive the file.

Late joining client devices 204 may be permitted for both on-demand and scheduled sessions. If one client device 204 is the threshold for using multicast, the session can begin immediately upon the first request, with all other client devices 204 being treated as late joiners. The client devices 204 may request blocks of the data file 206 through the content transfer protocol 208, 214. The content transfer protocol 208 on the multicast server 202 may divide the data file 206 into blocks such that each block is sent in an individual packet. The client devices 204 then receive the requested blocks of data using the transport protocol 210, 212 just as if they had joined at the beginning. However, late joining client devices 204 may receive blocks of the data file 206 in a different order, as further described below. The transport protocol 210 may number all packets to detect packet loss and identify them in case they need to be re-sent ("repaired"). The header of the transport protocol 210 may contain a packet number, while the header of the content transfer protocol 208 (inside the transport payload) contains the block number. The content transfer protocol 214 at the client devices 204 may thus need to be prepared to receive both blocks and packets out of order.

An exemplary implementation of a transmission session under control of the content transfer protocol 208, 214 and the transport protocol 210, 212 is also depicted in FIG. 2. Initially, a join request 216 requesting transmission of the data file 206 is generated by the content transfer protocol 214 on a client device 204. The join request 216 is passed to the transport protocol 212, which transmits the join request 218 over the network 215 to the multicast server 202. The transport protocol 210 at the server 202 receives the join request and may complete the join request with an acknowledgement automatically. However, if particular authorization for the requested content in the join request is required, the transport protocol 210 passes the join request 220 to the content transfer protocol 208. If the join request is authorized, the content transfer protocol 208 passes a join authorization 222 to the transport layer 210. The transport layer 210 may further assign a client identifier (ID) to each joining client device. The transport protocol 210 may also note the time that the client joined the session in order to manage the data transfer according to the protocol as further described below. The transport protocol 210 may then transmit a join acknowledgement 224 over the network 215 to the client device 204 with the client ID. The transport protocol layer 212 at the client device 204 may further pass the join acknowledgement 226 to the content transfer layer 214. The join acknowledgement 226 may include information regarding how to contact the appropriate content transfer server and the number of blocks, N, in the data file 206. If the requested multicast session is scheduled, the join acknowledgement 226 may also include a start time and duration of the scheduled session.

After completing any pending join requests, the content transfer protocol generates a poll request 228 to send to all joined client devices 204 polling which blocks of the data file 206 are needed by each client device. The transport layer 210 at the multicast server 202 transmits the poll request 230 to all of the joined client devices 204. The transport layer 212 on the client device 204 receives the poll and passes the poll request 232 to the content transfer layer 214 on the client device 204. The content transfer protocol 214 at the client device 204 responds to the poll request by generating a poll acknowledgement 234 and a list of needed blocks. Note that any client devices 202 that are the initial joiners will ask for all N packets. The transport layer 212 then transmits the poll acknowledgement 236 to the multicast server 202, where the transport layer 210 passes the acknowledgement to the content transfer layer 208 with the block requests from each of the client devices 204. The content transfer layer 208 then merges 240 all of the block requests from the poll responses and removes any duplicates to create a single ordered list of blocks of the data file 206 needed for transmission.

Once a merged list of blocks is created, the content transfer protocol 208 locates 242 the data blocks in the data file 206 and provides an identification 244 of the locations of the data blocks to the transport layer 210. Using this location information, the transport protocol 210 can directly access 246 the data in the data file 206 and read 248 the data blocks from the data file 206 for a semi-reliable multicast transmission 250 according to the transport protocol 210, 212 to the client devices 204. When the packets are received at the client devices 204, the data blocks are passed 252 to the content transfer layer 214 to be written to storage at the client device 204. Most lost packets are recovered using the transport protocol 210, 212, in particular through ACK and NAK transmissions 254 by the client devices 204. In response to NAK messages, the transport layer 210 at the multicast server 202 will attempt to resend packets 256 as long as the packets remain buffered on the server 202. The retransmitted packets received through the transport protocol 210, 212 are again passed to the content transfer layer for writing to storage. Some packets may, however, remain lost.

During the course of a transmission session, the transport protocol 210 may initiate additional queries 260 of the client devices 204 to, for example, check the status of the client devices 204. The transport layer 212 at the client devices 204 provides a response 262 to any of these sorts of queries. Once the content transfer protocol 214 has transmitted all requested blocks 264 over the transport protocol 210, the content transfer protocol 214 will use the transport protocol to poll the clients 266 to determine whether the client devices 204 need additional blocks from the file Consider a client device that joins the session late (a "late joiner"). When the client device joins, it will have missed the poll. The client device will simply begin receiving blocks as they come. Once all blocks from the previous poll response have been sent, another poll will occur, and the late joining client device may request any blocks that it still needs. Note that the transport protocol does not allow client devices 204 to request packets before the lowest packet number first provided for the poll session. These steps prevent late joiners from endlessly stalling the session at the start of the file. Thus, the transport protocol 210 will repeat the process for all joined client devices 204 until a client device 204 generates a leave notice 268. The transport protocol 212 at the client device 204 transmits the leave notice 270 to the multicast server 202 where the transport layer 210 passes the notice to the content transfer layer 208 so the previously assigned client ID may be dissociated from the client device 204 and the client device will leave the session. Alternatively, the transmission session may be terminated upon the expiration of a time period or when there are no further poll requests from the client devices 204.

A high level review of FIG. 2 identifies several primary channels that are used in this implementation for communication between a server and multiple client devices. A join channel provides the server tools to negotiate with client devices to join and exit a transmission session. A query channel allows the server to communicate with client devices about a status of the transmission session. A polling channel initiated by the content transfer protocol running on top of the transport protocol passes data integrity polls to the transport protocol and receives client device responses to the polls from the transport protocol. Finally, a data channel transmits data to client devices over a network.

The following detailed descriptions are representative of procedures that may form part of an exemplary multicast transport protocol. These procedures may involve the transfer of data packets with particular types of information transmitted between the multicast server and the client devices and further between the transport protocol and the content transfer protocol on the multicast server and the coordinate client devices.

Round Trip Time Estimation.

In order to estimate round trip time (RTT), some packets include a time field. This time is then echoed back in the response. The time is included in the packet, rather than just storing the value when the packet is sent, in order to avoid any confusion due to packets that are re-sent. Along with the echoed timestamp, a return packet from a receiver may include a "delta time" between receiving the timestamp and the time the packet is sent echoing it. This delta time should be excluded from the round trip time, i.e., RTT=(time echo received)—(echoed timestamp)—(delta time). Note that time may reach a maximum value and wrap around to zero. If the echoed timestamp has a greater value than the time the echo is received, then it should be interpreted as having wrapped around zero.

Session Start.

When a transmission session is created, the multicast server will not send anything over the network until at least one client has joined, i.e., a JOIN packet is received from the client device, the multicast server has responded with a JOIN-ACK, and the client device has completed the handshake with a QCR.

Joining Clients.

Upon receiving a JOIN packet, the server, assigns a unique ID to the client device and sends a JOIN-ACK packet with the ID. The server can receive JOIN requests at any time during the session (i.e., clients may join the session late). The JOIN-ACK packet may echo the timestamp from the JOIN packet (allowing the client device to know the RTT) and may also include a new timestamp that will be echoed back in the QCR packet, allowing the server to know the RTT of each client. The JOIN-ACK packet may also include the NAK back-off interval, so that client devices will not need to wait for a heartbeat message to learn it. The server should respond to every JOIN packet, even if repeated, as the JOIN may be repeated if the JOIN-ACK was lost.

After sending the JOIN-ACK, if no QCR packet is received within a timeout period, the JOIN-ACK may be repeated, with an updated timestamp. After multiple retries, the connection with the client may be presumed lost and the server may discard the state associated with the client. When a QCR is received in response to a JOIN-ACK, the server may update its RTT calculation for the client, and the client is considered ready for active participation in the transport protocol. If multiple QCR packets are received from the client, the server simply updates its RTT estimation for the client with information from the most recent QCR packet.

ACKer Selection.

The transport protocol selects a client device to act as a representative of all the client devices in a transmission session to acknowledge receipt of the data or alert the transport protocol that data was not received. The ACKer selection process may aim to locate a client device with the lowest throughput if each client device were using a separate TCP connection to transfer data. By choosing a client device with the lowest throughput, there is a higher likelihood that the other client devices connected with the session will receive the data. Because the steady-state throughput of a TCP connection may be characterized in a reasonably accurate way in terms of loss rate and RTT, the throughput for each client device can be estimated by using these two parameters.

ACKer selection may occur in the following exemplary cases: 1) at session startup; 2) upon the loss of the current ACKer; 3) upon receipt of a LEAVE packet from the current ACKer; 4) the current ACKer is unresponsive for a period of time; and 5) after a received NAK from another client indicates that it should be the ACKer. At session startup, since there cannot have been data loss at this point, selection of an ACKer may be based on the client with the longest RTT. At any given time, the transport protocol stores the expected throughput for the current ACKer. This value is updated every time an ACK or NAK from the current ACKer is received. Note that, after a new ACKer is selected, the multicast server will typically receive ACKs from the old ACKer for one RTT, and the feedback from different ACKers might be interleaved if the paths leading to them have different round trip times.

After the loss of the current ACKer, a QCC may be sent to obtain updated statistics from the clients. QCR responses may then be used to select a new ACKer using an algorithm to weigh various criteria, for example, the client device with the greatest packet loss or slowest channel. One exemplary ACKer selection algorithm is the Pragmatic General Multicast Congestion Control (PGMCC) criteria. In one implementation, the ACKer may be updated when a client device recognizes that its loss rate is worse than that of the present ACKer. In this instance, the transport protocol may be scripted to allow NAK suppression (discussed in further detail below) to be turned off at a client device when losses greater than those reported in an NCF (discussed in further detail below) from the ACKer occur so that the client device may be recognized as the new ACKer.

Query Channel Clients/Query Channel Replies.

The transport protocol sends a QCC packet to elicit a response from all client devices to determine RTT. The QCC packet includes a back-off interval calculated to prevent implosion. In one exemplary embodiment (e.g., for a target rate of 1000 QCR/sec), for n clients, the back-off interval may be set to n msec. The QCC sequence number may be included to allow clients to ignore old (out of order) QCC packets—it is not used for reliable delivery. QCR messages allow the transport protocol to keep an up to date list of clients in the session, which the transport protocol can then report to the content transfer protocol. Any client that has not responded to several (e.g., 3) successive QCCs, and also has not been heard from for a period of time (e.g., 1 minute) may be presumed lost, and its state may be flushed from the server's memory.

In addition, QCCs are sent to select an initial ACKer and when needing to elect a new ACKer when the prior ACKer is lost. Note that for ACKer selection purposes, any QCR reply would suffice to select an arbitrary client, so receiving a response from all clients is not necessary. QCCs may be sent periodically to maintain the status of client devices, and also to obtain application level data (typically used for status reports) in the QCRs. The transport protocol may allow the content transfer protocol to request an interval for issuing QCCs, so that it will know how current the reported state of clients is. However, the transport protocol should not allow QCCs to be overlapped, i.e., the prior QCC and responding QCRs should complete, so that QCR traffic is not doubled. Thus, the QCC interval may be chosen to be at least the QCR back-off plus the worst-case RTT.

Flow Windows.

Figure 3:
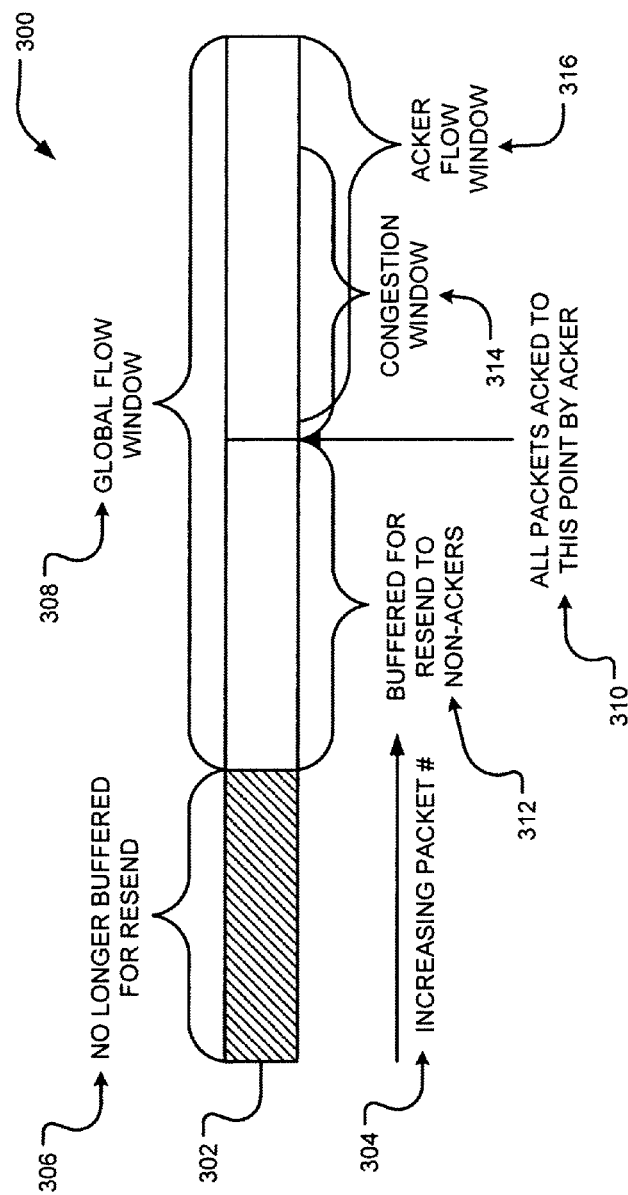
FIG. 3 is a schematic diagram depicting a relationship between several buffer flow windows according to an implementation of the transport protocol.

The transport protocol may maintain several windows 300 within a data buffer 302 on the server as shown in FIG. 3. Each of the windows may be understood to have a trailing edge (lowest packet number in the window) and a leading edge (highest packet number in the window) as indicated by the arrow 304 showing the direction of increasing packet numbers.

Global Flow Window.

The global flow window 308 is a flow window used across all client devices. Packets may be retained in an accessible buffer region 312 even after the ACKer has acknowledged receipt 310 beyond them, in order to allow other clients time to discover a loss, wait for a random time up to the NAK back-off interval, and send a NAK packet. Furthermore, the first NAK may be lost and may need to be resent after a further back-off. In one exemplary embodiment, if the maximum NAK back-off is t, and the largest client RTT is r, then packets may be kept in the global flow window for time 2(t+r).

After the trailing edge of the global flow window 308 is advanced, the packets 306 behind the trailing edge 306 are no longer buffered and available for retransmission. The trailing edge of the global flow window 308 is the furthest back that any client can NAK. This also prevents late-joining clients from perpetually delaying the transmission cycle by continually requesting older packets. The late-joining clients are thus cut off from the older packets, but can ultimately receive the missing data through the polling process administered by the content transfer protocol. The value of the trailing edge position may further be advertised to clients (e.g., in a source path message as described below) so that they will not request the unbuffered data via NAKs. Note also that packets can only be out of order up the size of the global flow control window 308, while blocks may be arbitrarily out of order.

Congestion Window.

In a window-based congestion control scheme such as TCP, a congestion window 314 represents, among other things, the maximum amount of packets in the data stream at any time, which in turn controls the throughput of the session. The sender keeps track of the actual number of packets in the data stream, based upon its transmissions and the reception of acknowledgements. The congestion window 314 may be defined by a certain number of packets beyond the trailing edge of the ACKer flow window 316. The size of the congestion window 314 may be determined by a congestion control algorithm to limit the number of packets in the data stream. The trailing edge of the congestion window 314 may be set to the sequence number 310 to which the ACKer has acknowledged. The sequence number 310 in an ACK packet is cumulative; it acknowledges receipt of all packets up that number.

Note that when a new ACKer is selected, it may indicate a sequence number 310 lower than the previous trailing edge of the congestion window 314. In this case, the congestion window 314 may back up, but no further than the trailing edge of the global flow window 308. The size of the congestion window 314 should remain the same to prevent the transport protocol from sending a burst of packets from the server at its maximum rate until the new ACKer catches up.

The leading edge of the congestion window 314 is determined by the current congestion window size, which is set according to an algorithm (e.g., the PGMCC algorithm). Once this leading edge has been reached, the transport protocol may not be allowed to send any more packets until the trailing edge is advanced by an ACK (which also advances the leading edge).

ACKer Flow Window.

The ACKer may also have an ACKer flow window 316, similar to TCP, to indicate how much buffer space is available for receipt of messages. This ACKer flow window 316 may prevent unnecessary loss due to sending packets that cannot be received. The trailing edge of the ACKer flow window 316 is one beyond the point to which all packets have been acknowledged by the ACKer. The leading edge of the ACKer flow window 316 may be calculated by adding the buffer space available at the ACKer to the trailing edge. When the ACKer flow window 316 is used, the leading edge of the congestion window 314 may be limited to be at most the leading edge of the ACKer flow window 316 (although it may be lower).

Source Path Messages.

Source Path Messages (SPM) are heartbeat packets sent to advertise some current protocol values (most notably the flow control window, NAK back-off interval, and the ACKer ID). The sequence numbers used for SPM are independent of ODATA sequence numbers. While data packets are being sent, SPMs may be interleaved periodically (e.g., every 0.5 seconds) to refresh the NAK back-off value. When data packets are not being sent, SPMs may be sent to provoke NAKs from clients (in the case that the most recent packets have been lost). SPMs also elicit a response from the ACKer, ensuring that it is still alive.

In one implementation, after a data packet (e.g., ODATA or RDATA) is sent, or at session startup, a timer is set for a period of time (e.g., 0.1 sec). If this timer expires without any new ODATA being sent (and re-setting the timer), then an SPM may be sent. The timer may then be doubled and the wait is repeated again with an SPM being sent if no ODATA is sent. The timer may continue to be doubled up to a maximum value (e.g., 0.5 seconds). The timer may be reset to its minimum value whenever ODATA or RDATA is sent.

NAK Backoff Interval.

The transport protocol determines the NAK back-off interval and advertises it to all clients in SPMs. The duration of the NAK back-off interval for n clients may be set to a predetermined value (e.g., n/5 msec obtains a NAK rate of 5000 NAKs/sec). The minimum interval may be set to the RTT of the ACKer to allow the NAK of the ACKer to suppress other NAKs whenever possible. Similarly, the maximum back-off duration may be set as the minimum NAK back-off interval+n msec.

RDATA Rate/Conzestion Control.

RDATA must follow the same rules as ODATA by keeping within the congestion window. It may seem that RDATA could never be beyond the congestion window, however, it may be constrained by the congestion window when the congestion window is reduced due to a NAK; the congestion window moves backward due to the switch to a new ACKer Polling.

When instructed to take a poll by the content transfer protocol, with given data, the transport protocol sends out a POLL packet with the given data. The back-off interval may be the same as for a QCC packet. A new poll may be started before the previous one completes (i.e., before all poll responses are in), but it will have the effect of canceling the previous poll. Only one poll may be active at any one time in order to limit poll response traffic.

Session Join.

Clients may use a separate content transfer level communication to request session details. Each client joining a session first sends a JOIN packet to the server. This packet is sent by the client to request a unique Client Id from server and to let the server know that client will be part of the session.

Clients can receive ODATA and RDATA packets on the multicast channel even before they receive the JOIN-ACK packet, but may not send any packets on the channel until they receive a JOIN-ACK.

After sending a JOIN packet, the client may set a timer for a period of time (e.g., 0.1 second) to wait for a JOIN-ACK. If no JOIN-ACK packet is received until after the timer expires, then the JOIN packet may be re-sent with an updated timestamp. This re-sending may be continued with the timer doubling up to a maximum period of time (e.g., 1 second). Re-sending continues indefinitely, up to the server-silence timeout (see below). When the JOIN-ACK is received, the client may send a QCR packet, echoing the timestamp in the JOIN-ACK. The client may respond to as many JOIN-ACKs as are received as multiple JOIN-ACKs may occur, e.g., in the case of a lost QCR packet. Note that QCRs are sent immediately upon receiving a JOIN-ACK, unlike after a QCC, where a back-off occurs.

Server Silence Timeout.

If no packets have been received from the server for a period of time (e.g., 30 seconds) at any time, the server is presumed unreachable and the client will terminate.

QCC Response.

Upon receipt of a QCC packet, client devices pick a random back-off from zero to a maximum value specified in QCC packet. When the back-off timer expires it sends the QCR packet to the server on the unicast channel.

SPM Reception.

Clients should receive SPMs and react to the values as indicated in other sections herein. Out of order SPMs (as indicated by their SPM sequence number) may be ignored, i.e., the client devices should track the highest SPM sequence number ever received and ignore all SPMs with a lower or equal value.

Loss Detection.

Client devices detect loss based on gaps in the ODATA sequence numbers. These gaps may be discovered via reception of any server packet. For example, an SPM may indicate a leading sequence number corresponding to a packet that has never been received. Alternately, an RDATA packet may reveal that a number of packets are missing. Note that a missing sequence number may even be detected by a NCF. An NCF based upon a NAK from the ACKer may also carry header information to broadcast a loss report based upon the losses experienced by the ACKer, which may be used in the selection of a new ACKer.

In the case of ODATA revealing a gap in the sequence numbers, when a gap of exactly one packet is discovered, and the current packet has the highest value yet observed, the client may immediately consider loss to have occurred. In this case, it may be that the packet was received out of order ahead of the previous packet (e.g., due to network changes, or winsock not guaranteeing in-order delivery). To avoid needlessly NAKing, the client may wait for one more packet to be received to confirm loss rather than out of order reception. Note that any subsequent packet that is not the missing one confirms the loss, it need not be an ODATA packet.

ACK Packets.

A client sends an ACK packet in response to SPM, ODATA and RDATA packets, if the packets indicate that they are the current ACKer. An ACK is sent immediately by the current ACKer with no back-off. The ODATA sequence number ACKed is cumulative, e.g., an ACK for packet number 20 acknowledges all packets up to packet 20. The ACK for RDATA, ODATA, and SPM may always be the same. The client device may report the highest sequence number up to which it acknowledges all packets, as well as the highest sequence number ever received, the loss rate, and the receive status bitmask.

NAK Packets.

Figure 4:
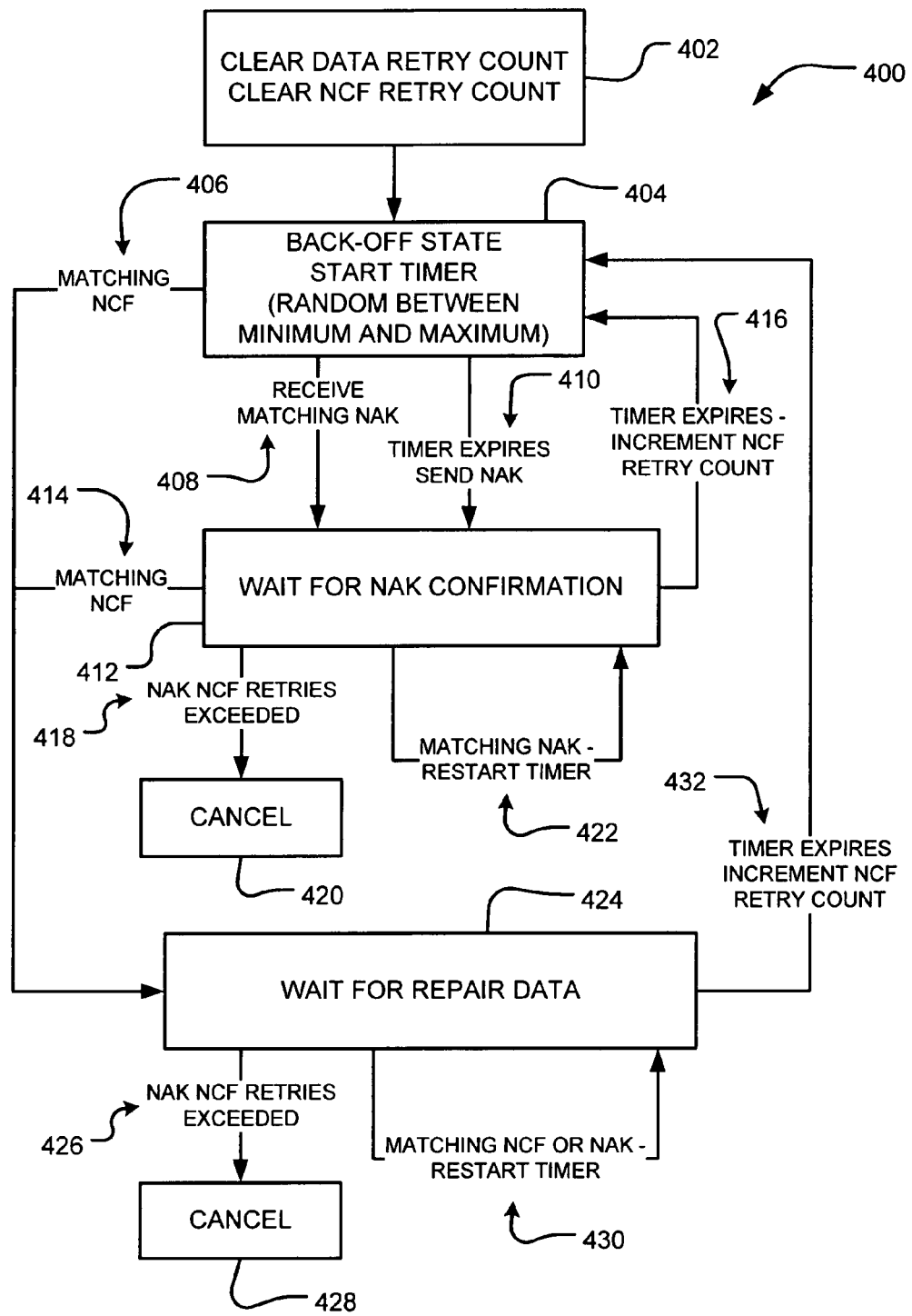
FIG. 4 is a state diagram depicting an exemplary back-off procedure within the transport protocol for sending negative acknowledgement of receipt of data packets to rectify data loss and minimize network congestion.

Once packet loss has been detected, the client may set its back-off timer to NAK for the detected lost packets as in the exemplary state diagram 400 presented in FIG. 4. At the beginning of a transmission cycle, the data retry counter and the NCF retry counter should be cleared 402. If the most recent packet indicated the client is the ACKer, the timer may be set to zero because the ACKer is supposed to NAK immediately rather than waiting for any back-off period. If the loss was detected due to an NCF, then the client should behave as if it had already NAKed the packet, and heard the corresponding NCF 406. Otherwise, the timer may be set to a random value from a minimum back-off to a maximum back-off from the most recent SPM or JOIN-ACK 404. When the timer expires, any outstanding NAKs may be combined into a single NAK packet and sent to the server 412. If the all the outstanding NAKs will not fit in the same packet, then the oldest (lowest sequence number) packets should be NAKed first.

NAK generation follows the detection of a missing data packet. An exemplary wait cycle is also depicted in FIG. 4. In a first waiting period 404, the transport protocol waits for a random period of time from a minimum back-off to a maximum back-off 404 from the most recent SPM or JOIN-ACK to send a NAK indicating missing data, while listening for matching NCFs 406 or NAKs 408. If a matching NCF or NAK is not heard before expiration of the back-off period, then the protocol will transmit a NAK 410 identifying the missing data packet. If either a matching NAK notification was received or a NAK was transmitted, a second waiting period 412 is entered to wait for an NCF from the server, confirming receipt of the NAK from this or another client device. Alternately, if a matching NCF is received, then the state machine transitions to a third waiting period 424 to await receipt of the repair data.

If while in the second waiting period 416 waiting for a matching NCF, the timer for receipt of a NCF expires, a retry counter may be incremented 414 and the state may return to the first waiting period 404 to wait for a back-off period before sending another NAK. If this process continues without receiving a NCF and the retry counter reaches its maximum 418 without receiving a NCF or RDATA in response to a NAK, the transport protocol at the client may cancel 420 the attempt to recover the lost packet. However, if another matching NAK is heard rather than receiving a NCF, the NCF timer of the second waiting period 412 may be reset 422 and the transport protocol on the client device may wait for an NCF in response to the new NAK.

Similarly, if while in the third waiting period 424 waiting for RDATA corresponding to the NCF, the timer for receipt of the RDATA expires, a retry counter may be incremented 432 and the state may return to the first waiting period 404 to wait for a back-off period before sending another NAK. If this process continues without receiving any RDATA and the retry counter reaches its maximum 426 without receiving any RDATA following the NCF confirmation of the NAK, the transport protocol at the client may cancel 428 the attempt to recover the lost packet. However, if another NCF or matching NAK is heard rather than receiving the RDATA, the timer of the third waiting period 424 may be reset 430 and the transport protocol on the client device may wait for the RDATA in response to the new NCF or NAK.

In any state, receipt of matching RDATA or ODATA completes data recovery and successful exit from the state machine. State transition stops any running timers. Any reception of RDATA (i.e., of packets not requested by the particular client) should reset the timer in the third waiting period 424 for RDATA, since the RDATA being waited for may be queued after the currently received RDATA. Placing the state diagram of FIG. 4 in context with the flow windows of FIG. 3, in any state, if the trailing edge of the window moves beyond the sequence number 310, data recovery for that sequence number 310 terminates.

Poll Reply.

When a poll packet is received, a random timer selected between zero and the backoff indicated in the packet is triggered and the packet is immediately passed to the application layer. The client application may immediately queue a reply, but the transport layer does not send this response until the timer has gone off. This mechanism spreads out client replies and prevents implosion. Any poll message received out of order (e.g., with a sequence number less than the maximum ever seen) should be ignored. Any poll message arriving while another poll reply is pending will cancel the previous reply. Only one poll may be active at any time to avoid increasing poll reply traffic.

Leave Message.

When a client leaves the session, it should send a LEAVE message. The client application may terminate the transport in two ways. First, the client may indicate that transmission is complete. In this case, a random back-off timer using the NAK back-off interval may be observed before sending the leave message to prevent implosion when many clients complete at once. Second, the client may indicate the session is being manually cancelled. In this case, no back-off is observed because synchronization with other clients is very unlikely and because the user will be waiting for a response. The LEAVE is not reliable, i.e., there is no ACK packet sent from server to the client for LEAVE packets.

An exemplary general purpose computing device that may be in the form of the multicast server or a client device is depicted in FIG. 5. The general purpose computer 500 includes a processing unit 502, a system memory 504, and a system bus 518 that operatively couples various system components, including the system memory 504 to the processing unit 502. There may be only one or there may be more than one processing unit 502, such that the processor of computer 500 comprises a single central processing unit (CPU), or a plurality of processing units, commonly referred to as a parallel processing environment. The computer 500 may be a conventional computer, a distributed computer, or any other type of computer; the invention is not so limited.

The system bus 518 may be any of several types of bus structures including a memory bus or memory controller, a peripheral bus, a switched fabric, point-to-point connections, and a local bus using any of a variety of bus architectures. The system memory 504 may also be referred to as simply the memory, and includes read only memory (ROM) 506 and random access memory (RAM) 505. A basic input/output system (BIOS) 508, containing the basic routines that help to transfer information between elements within the computer 500, such as during start-up, is stored in ROM 506. The computer 500 further includes a hard disk drive 530 for reading from and writing to a hard disk, not shown, a magnetic disk drive 532 for reading from or writing to a removable magnetic disk 536, and an optical disk drive 534 for reading from or writing to a removable optical disk 538 such as a CD ROM or other optical media.

The hard disk drive 530, magnetic disk drive 532, and optical disk drive 534 are connected to the system bus 518 by a hard disk drive interface 520, a magnetic disk drive interface 522, and an optical disk drive interface 524, respectively. The drives and their associated computer-readable media provide nonvolatile storage of computer-readable instructions, data structures, program modules and other data for the computer 500. It should be appreciated by those skilled in the art that any type of computer-readable media that can store data that is accessible by a computer, for example, magnetic cassettes, flash memory cards, digital video disks, RAMs, and ROMs, may be used in the exemplary operating environment.

A number of program modules may be stored on the hard disk 530, magnetic disk 532, optical disk 534, ROM 506, or RAM 505, including an operating system 510, one or more application programs 512, other program modules 514, and program data 516. In an exemplary implementation, the content transfer and transport protocols may be incorporated as part of the operating system 510, application programs 512, or other program modules 514.

A user may enter commands and information into the personal computer 500 through input devices such as a keyboard 540 and pointing device 542, for example, a mouse. Other input devices (not shown) may include, for example, a microphone, a joystick, a game pad, a tablet, a touch screen device, a satellite dish, a scanner, a facsimile machine, and a video camera. These and other input devices are often connected to the processing unit 502 through a serial port interface 526 that is coupled to the system bus 518, but may be connected by other interfaces, such as a parallel port, game port, or a universal serial bus (USB).

A monitor 544 or other type of display device is also connected to the system bus 518 via an interface, such as a video adapter 546. In addition to the monitor 544, computers typically include other peripheral output devices, such as a printer 558 and speakers (not shown). These and other output devices are often connected to the processing unit 502 through the serial port interface 526 that is coupled to the system bus 518, but may be connected by other interfaces, such as a parallel port, game port, or a universal serial bus (USB).

The computer 500 may operate in a networked environment using logical connections to one or more remote computers, such as remote computer 554. These logical connections may be achieved by a communication device coupled to or integral with the computer 500; the invention is not limited to a particular type of communications device. The remote computer 554 may be another computer, a server, a router, a network personal computer, a client, a peer device, or other common network node, and typically includes many or all of the elements described above relative to the computer 500, although only a memory storage device 556 has been illustrated in FIG. 5. The logical connections depicted in FIG. 5 include a local-area network (LAN) 550 and a wide-area network (WAN) 552. Such networking environments are commonplace in office networks, enterprise-wide computer networks, intranets and the Internet, which are all types of networks.

When used in a LAN 550 environment, the computer 500 may be connected to the local network 550 through a network interface or adapter 528, e.g., Ethernet or other communications interfaces. When used in a WAN 552 environment, the computer 500 typically includes a modem 548, a network adapter, or any other type of communications device for establishing communications over the wide area network 552. The modem 548, which may be internal or external, is connected to the system bus 518 via the serial port interface 526. In a networked environment, program modules depicted relative to the personal computer 500, or portions thereof, may be stored in a remote memory storage device. It is appreciated that the network connections shown are exemplary and other means of and communications devices for establishing a communications link between the computers may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understand that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method for use in a computer system, the method comprising:
    negotiating with a plurality of client devices, via a join channel, to join and exit a multicast transmission session at different times, wherein a first one of the plurality of client devices is permitted to join the multicast transmission session at a first time and wherein a second one of the plurality of client devices is permitted to join the multicast transmission session at a second time, wherein the first time is different from the second time, and wherein each of the plurality of client devices is able to receive the entirety of content associated with the multicast transmission session regardless of when each of the plurality of client devices joins the multicast transmission session;
    communicating with the plurality of client devices, via a query channel, about a status of the multicast transmission session;
    via a polling channel:
        (i) transmitting polling queries received from a content transfer protocol, (ii) receiving, from the plurality of client device, responses to the polling queries, and (iii) passing the responses to the content transfer protocol;
    transmitting data to the plurality of client devices via a data channel;
    querying the plurality of client devices to determine a round trip time associated with each of the plurality of client devices;
    selecting a single representative client device from the plurality of client devices to be a sender of acknowledgement messages based upon the determined round trip times; and
    advertising a minimum negative acknowledgement back-off interval based on the round trip time associated with the selected representative client device.

2. The method of claim 1 further comprising receiving, from the single representative client device, an acknowledgement message that includes a cumulative identification of all received data packets by the single representative client device.

3. The method of claim 1 further comprising:
    generating a source path message that includes one or more current protocol values, the one or more current protocol values comprising the advertised minimum negative acknowledgement back-off interval and the selected single representative client device; and
    upon generation of the source path message, implementing a delay period configured to provide a window of time to receive, responsive to the source path message, an acknowledgement message from the selected single representative client device.

4. The method of claim 1 further comprising, at a client device of the plurality of client devices, and responsive to detecting loss of a data packet:
    when the client device is not the single representative client device:
        calculating a random back-off period based on the minimum negative acknowledgement back-off interval;
        delaying, for the random back-off period, transmission of a negative acknowledgement message corresponding to the data packet; and
    when the client device is the single representative client device:
        transmitting the negative acknowledgement message without waiting for any back-off period.

5. The method of claim 4 further comprising, at the client device, when the client device not the single representative client device:
    determining that the negative acknowledgement message need not be transmitted based on the receipt of at least one of: (a) receipt of the data packet, (b) receipt of repair data corresponding to the data packet, or (c) receipt of a negative acknowledgement confirmation message corresponding to the negative acknowledgement message; and
    responsive to determining the negative acknowledgement message need not be transmitted, not transmitting the negative acknowledgement message.

6. The method of claim 1 further comprising suppressing immediate negative acknowledgement messages from all client devices except the single representative client device.

7. The method of claim 6 further comprising:
    transmitting a negative acknowledgement confirmation message that includes a data loss rate reported from the single representative client device; and
    responsive to an indication that a particular client device other than the single representative client device has a local data loss rate worse than the data loss rate reported from the single representative client device, allowing a negative acknowledgement suppression waiver at the particular client device.

8. The method of claim 1 wherein at least a first client device of the plurality of client devices is an initial joiner, and wherein at least a second client device of the plurality of client devices is late joiner.

9. The method of claim 8, wherein transmitting data to client devices via a data channel further comprises sending a block of a data file corresponding to the transmission session to the first client device prior to the second client device joining the transmission session.

10. The method of claim 1
wherein negotiating with a plurality of client devices comprises:
receiving, from a first client device of the plurality of client devices, a join request comprising a join request timestamp;
assigning, responsive to the join request, a first client identifier for the first client device;
sending, to the first client device, responsive to the join request, a join acknowledgement comprising: (a) the assigned first client identifier, (b) the join request timestamp, (c) a first timestamp, (d) a first minimum NAK back-off time, and (e) a first maximum NAK back-off time; and
receiving, from the first client device, responsive to the join acknowledgement, a first query channel reply packet comprising: (a) the first client identifier, and (b) the first timestamp:
wherein (i) the join channel is configured to use unicast endpoints, (ii) a query channel is configured to transmit to the plurality of joined clients over a first unreliable base multicast protocol, (iii) the querying the plurality of client devices to determine a round trip time occurs via the query channel, (iv) the polling channel is configured to transmit to the plurality of joined clients over a second unreliable base multicast protocol, and (v) the data channel is configured to transmit to the plurality of joined clients over a third unreliable base multicast protocol; and
wherein communicating with the plurality of client devices comprises:
sending, to the plurality of joined client devices, a second query channel client packet comprising: (a) a second back-off interval, and (b) a second timestamp; and
receiving, from the first client device and responsive to the second query channel client packet, a second query channel reply packet comprising: (a) the first client identifier, (b) the second timestamp, and (c) a second delta time;
determining a third round trip time for the first client device, the third round trip time selected from the group consisting of a first round trip time and a second round trip time, wherein the determining the first round trip time is based on the first timestamp and the time the first query channel reply packet was received, and wherein the determining the second round trip time is based on the second timestamp, the second delta time, and the time the second query channel reply packet was received, and further wherein the first client device is selected as the single representative device based on the third round trip time; and
wherein transmitting data to the plurality of client devices via the data channel comprises:
transmitting, to the joined client devices, a source path message, the source path message advertising current protocol values, wherein the current protocol values include the minimum negative acknowledgement back-off interval and an indication that the first client is the single representative client device, and wherein advertising the minimum negative acknowledgement back-off interval includes transmitting the source path message; and
transmitting, to the joined client devices, a data packet comprising a transport header, a content header, and a content payload, wherein the transport header includes an indication that the first client is the single representative client device.

11. The method of claim 10, wherein the first unreliable base multicast protocol uses user datagram protocol multicast for transmission to the plurality of joined clients, the second unreliable base multicast protocol uses user datagram protocol multicast for transmission to the plurality of joined clients, and the third unreliable base multicast protocol uses user datagram protocol multicast for transmission to the plurality of joined clients.

12. A reliable multicast transmission system comprising:
a server computing device, the server computing device comprising:
a transport protocol layer, the content transfer protocol layer comprising:
a join channel for negotiating with a plurality of client devices to join and exit a multicast transmission session at different times, wherein a first one of the plurality of client devices is permitted to join the multicast transmission session at a first time and wherein a second one of the plurality of client devices is permitted to join the multicast transmission session at a second time, wherein the first time is different from the second time, and wherein each of the plurality of client devices is able to receive the entirety of content associated with the multicast transmission session regardless of when each of the plurality of client devices joins the multicast transmission session;
a query channel for communicating with the plurality of client devices about a status of the multicast transmission session;
a polling channel that transmits polling queries to the plurality of client devices and responses to the polling queries from the plurality of client devices; and
a data channel for transmitting a data file to the plurality of client devices;
wherein the transport protocol layer is further configured to:
suppress immediate acknowledgement messages from each of the plurality of client devices except for a single representative client device, wherein the single representative client device is selected based on round trip times associated with the plurality of client devices; and
advertise a minimum negative acknowledgement back-off duration based on the round trip time corresponding to the single representative client device; and
a content transfer protocol layer, the content transfer protocol layer comprising:
a data management function that identifies the data file for the multicast transmission session and provides the data file to the transport protocol layer in a form suitable for transmission; and
a polling management function that generates the polling queries to monitor reliability of data transmissions by the transport protocol layer, pass the polling queries to the transport protocol layer for transmission to the client devices, and receive responses to the polling queries by the plurality of client devices from the transport protocol layer.

13. The system of claim 12, wherein the polling queries ask the plurality of client devices for a number of blocks of the data file being transmitted that the plurality of client devices have yet to receive.

14. The system of claim 13, wherein the data management function further provides non sequential access to blocks of the data file to provide only blocks of the data file that the plurality of client devices have yet to receive.

15. The system of claim 13, wherein the data management function further removes duplicate block requests to create a single list of blocks to access for transmission.

16. The system of claim 15, wherein when removing duplicate block requests, the data management function begins with blocks requested by an oldest joining client device of the plurality of client devices and merges only blocks requested by other client devices of the plurality of client devices that joined the transmission session within a set time period of the oldest joining client device.

17. The system of claim 12, wherein the data management function guarantees integrity of the data file during the transmission session.

18. A method in a computer system for providing reliable multicast transmissions comprising:
negotiating with a plurality of client devices to join and exit a multicast transmission session at different times, wherein a first one of the plurality of client devices is permitted to join the multicast transmission session at a first time and wherein a second one of the plurality of client devices is permitted to join the multicast transmission session at a second time, wherein the first time is different from the second time, and wherein each of the plurality of client devices is able to receive the entirety of content associated with the multicast transmission session regardless of when each of the plurality of client devices joins the multicast transmission session;
communicating a query to the plurality of client devices requesting a status of the transmission session;
receiving a polling query initiated by a content transfer protocol;
transmitting the polling query to the plurality of client devices;
receiving responses to the polling query from the plurality of client devices;
passing responses to the polling query to the content transfer protocol;
transmitting a data file to the plurality of client devices;
determining round trip times associated with the plurality of client devices;
selecting one of the plurality of client devices to be a representative client device based upon the determined round trip times, wherein the representative client device transmits negative acknowledgement messages on behalf of the other client devices; and
advertising a minimum negative acknowledgement back-off time that corresponds to the round trip time associated with the selected representative client device, wherein the minimum negative acknowledgement back-off time indicates a minimum time for other client devices to wait before transmitting a negative acknowledgement message in response to missing a data packet.

19. The method of claim 18 further comprising providing non sequential access to blocks of the data file to provide only blocks of the data file that the plurality of client devices have yet to receive.

* * * * *